(12) United States Patent
Meier

(10) Patent No.: US 7,410,004 B2
(45) Date of Patent: Aug. 12, 2008

(54) AGRICULTURAL IMPLEMENT CARRIER

(76) Inventor: Ned H. Meier, 720 Third Rd., Grand Island, NE (US) 68801

( * ) Notice: Subject to any disclaimer, the term of this patent is extended or adjusted under 35 U.S.C. 154(b) by 609 days.

(21) Appl. No.: 11/148,762

(22) Filed: Jun. 9, 2005

(65) Prior Publication Data

US 2005/0274531 A1     Dec. 15, 2005

Related U.S. Application Data

(60) Provisional application No. 60/579,043, filed on Jun. 11, 2004.

(51) Int. Cl.
*A01B 63/118* (2006.01)

(52) U.S. Cl. .......................... 172/450; 172/47; 172/776

(58) Field of Classification Search ............... 111/52, 111/55, 57, 59, 200, 120; 172/450, 451, 172/446, 677, 439, 456, 311, 779, 785, 138, 172/443, 272, 117, 780, 781, 795, 235, 254, 172/273, 816, 827, 828, 683, 47, 776; 280/186; 404/128

See application file for complete search history.

(56) References Cited

U.S. PATENT DOCUMENTS

| | | | | | |
|---|---|---|---|---|---|
| 977,576 | A * | 12/1910 | Weaver | ............. | 111/83 |
| 1,760,128 | A * | 5/1930 | Enz | ............. | 172/298 |
| 1,893,512 | A * | 1/1933 | Zuckerman | ............. | 111/186 |
| 2,276,697 | A * | 3/1942 | Peterson | ............. | 111/59 |
| 2,488,016 | A * | 11/1949 | Lado | ............. | 172/785 |
| 3,031,208 | A * | 4/1962 | Abbott | ............. | 172/439 |
| 3,039,540 | A * | 6/1962 | Ward | ............. | 172/449 |
| 3,224,392 | A * | 12/1965 | Mellen | ............. | 111/52 |
| 3,543,704 | A * | 12/1970 | Hansen et al. | ............. | 111/52 |
| 3,640,005 | A * | 2/1972 | Chiarolanza et al. | ............. | 37/234 |
| 3,845,577 | A * | 11/1974 | Naymik | ............. | 37/231 |
| 3,881,563 | A * | 5/1975 | Hammersmith | ............. | 180/14.1 |
| 4,034,687 | A * | 7/1977 | van der Lely | ............. | 111/133 |
| 4,282,621 | A * | 8/1981 | Anthony et al. | ............. | 14/71.1 |
| 4,286,918 | A * | 9/1981 | Shannon | ............. | 414/742 |
| 4,611,683 | A | 9/1986 | Hilmer | | |
| 4,679,634 | A * | 7/1987 | Bulmahn | ............. | 172/250 |
| 4,705,427 | A * | 11/1987 | Atkins et al. | ............. | 405/36 |
| 5,092,422 | A * | 3/1992 | Hood et al. | ............. | 188/329 |
| 5,116,096 | A * | 5/1992 | Taylor | ............. | 296/3 |
| 5,178,511 | A * | 1/1993 | Wedin | ............. | 414/703 |
| 5,435,082 | A * | 7/1995 | Frenette et al. | ............. | 37/235 |
| 6,585,056 | B2 * | 7/2003 | Pellenc et al. | ............. | 172/133 |
| 6,698,527 | B1 * | 3/2004 | White et al. | ............. | 172/450 |

* cited by examiner

*Primary Examiner*—Thomas B Will
*Assistant Examiner*—Jamie L McGown
(74) *Attorney, Agent, or Firm*—Bracewell & Giuliani LLP

(57) ABSTRACT

A self-propelled agricultural tool carrier has a lifting carriage mounted between the front and rear sets of wheels. A tool bar adapter is mounted to the lifting carriage below the frame for connection to a tool bar that supports planting and cultivating equipment. Laterally spaced-apart stabilizing legs are rigidly mounted to the frame and extend downward along opposite sides of the lifting carriage. The tool bar has a pair of braces, each of which engages a support member on a lower portion of each of the stabilizing legs to restrain the tool bar against lateral movement. Causing the carriage to lift raises the tool bar and disengages the braces from the support members.

16 Claims, 8 Drawing Sheets

US 7,410,004 B2

AGRICULTURAL IMPLEMENT CARRIER

This invention claims priority to provisional application Ser. No. 60/579,043, filed Jun. 11, 2004.

FIELD OF THE INVENTION

This invention relates in general to agricultural implements, and in particular to a self-propelled carrier for agricultural practice.

BACKGROUND OF THE INVENTION

Corn and many other crops are normally grown in parallel rows. Controlling weeds that grow between the rows is a serious problem. One method employs chemical herbicides, but such herbicides can cause environmental or chemical resistance problems and are expensive. An alternative to chemical control of weeds is to use mechanical means to cultivate between the rows.

In one type of row crop planting, the ridge developed from the previous year's crop serves as the seedbed. During planting, approximately 1½ inches of soil are removed from the top and sides of the ridge. The soil, weeds and weed seed are then removed to the side of the ridge. The crop is then planted into this ridge with the hope that it has time to germinate and grow before new weeds can become established.

Accomplishing weed control at planting time requires tillage equipment that can be positioned and maintained on the top and center of the previous year's ridge. The natural tendency for the row cleaning mechanism is to shift sideways off the top of the ridge. A very high degree of lateral stability is required to maintain the row cleaning mechanism on the top and center of the ridge.

It is also important that a starter fertilizer be placed next to the seed. One current suggestion for optimum placement of starter fertilizer is two inches to the side and two inches below the seed. The proper placement of the fertilizer is important if maximizing early growth is to be achieved.

Weed control during the cultivation process depends upon the crop becoming established and attaining a height of approximately four inches before new weeds can get started. This growth depends upon precise planting and fertilizing. One cultivation procedure is a two step process achieved in one pass through the field. The tool carrier places the tillage tool very close on each side of the plants and removes any weeds that exist in that area. The soil and weeds are removed to the side and away from the plants. The second step requires a mechanism equipped with a crop shield that is typically two inches wide at the bottom and approximately three feet long. As the crop passes through the shield, soil is moved into the row to a depth of about 1½ inches. This soil covers any weeds that were missed in the first cultivation step.

Current row crop equipment comprises a tool carrier with a three-point hitch assembly behind the rear axle. A laterally extending tool bar connects to the hitch. Various planting and cultivating equipment are mounted to the tool bar and spaced apart to match the rows. The lift arms and control links between the tool bar and the tool carrier are not rigidly attached to the tool carrier. As the tool carrier moves along the rows, the tool bar tends to move laterally. Better weed control could be achieved if the planting and cultivating equipment could be more precisely controlled. One goal would be to achieve an accuracy of plus or minus one inch while operating at speeds of 4.5 to 6.0 miles per hour. Planting, fertilizing and cultivating with currently available implements at this level of accuracy is not possible.

SUMMARY OF THE INVENTION

The tool carrier assembly of this invention has features for precision control of the positions of the agricultural tools being employed. A lifting carriage mounted to the tool carrier frame moves between a lower position and an upper position relative to the frame. A tool bar adapter is mounted to the lifting carriage. Laterally spaced-apart stabilizing legs extend downward from the frame along opposite sides of the lifting carriage. A laterally extending tool bar for supporting agricultural tools has a hitch assembly that releasably couples to the tool bar adapter for being raised and lowered by the lifting carriage. When the lifting carriage is in the lower position, the stabilizing legs provide lateral support for the lifting carriage and the tool bar to restrain lateral movement of the tool bar.

Preferably, support members are rigidly mounted to the stabilizing legs. A pair of braces is rigidly connected to the tool bar in the preferred embodiment for engaging the support members while the carriage is in the lower position. The braces disengage from the support members while the lifting carriage and the tool bar are in the upper position for transport.

Preferably, a separate steering servo is mounted to each of the wheels for steering each of the wheels independently of the other wheels. A central control unit controls the steering servos. The central control unit has a turn-around mode in which the central control unit positions an axis of each of the wheels on a radial line emanating from a common center point.

DETAILED DESCRIPTION OF THE INVENTION

Figure 1:
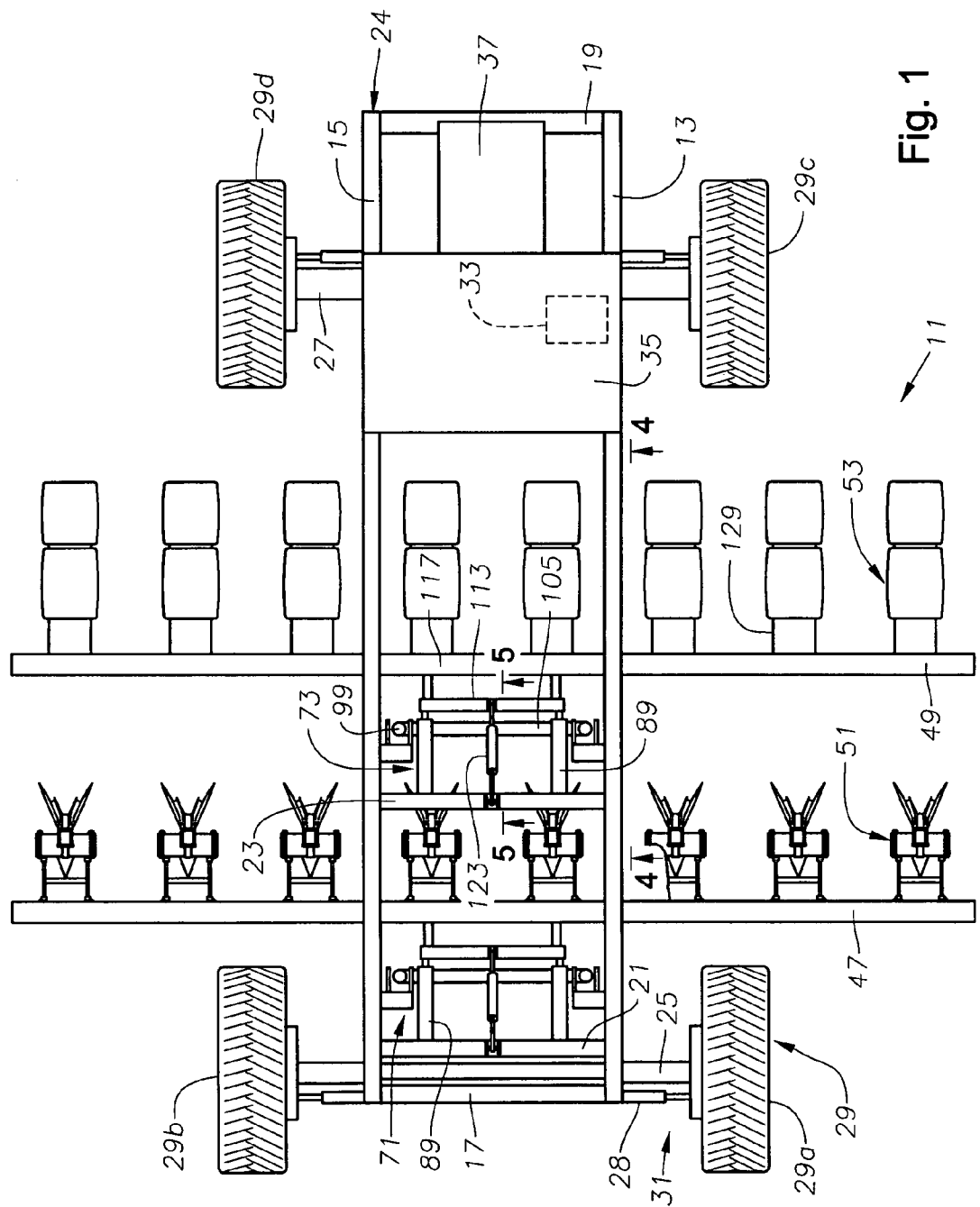
FIG. 1 is a top view of a agricultural tool carrier constructed in accordance with this invention.

Referring to FIG. 1, an agricultural tool carrier assembly 11 has a pair of longitudinal beams 13, 15 that are parallel to each other. Longitudinal beams 13, 15 are interconnected by a number of beams, including a forward end cross member 17, a rearward end cross member 19, a forward intermediate cross member 21 and a rearward intermediate cross member 23. The interconnections of beams 13, 15 with cross members 19, 21 and 23 define a rectangular frame 24 having a greater length than width.

A forward axle 25 is mounted to frame 24 near forward end cross member 17. A rearward axle 27 locates near rearward end cross member 19. Wheels 29 are mounted to each axle 25, 27. Preferably, each wheel 29 has an independent steering mechanism or servo 31 that allows each wheel 29 to be turned relative to longitudinal beams 13, 15 independently of the other wheels 29. Servo 31 may be of various types, and preferably includes a hydraulic cylinder 28 is mounted adjacent each wheel 29 for steering the wheel.

Figure 8:
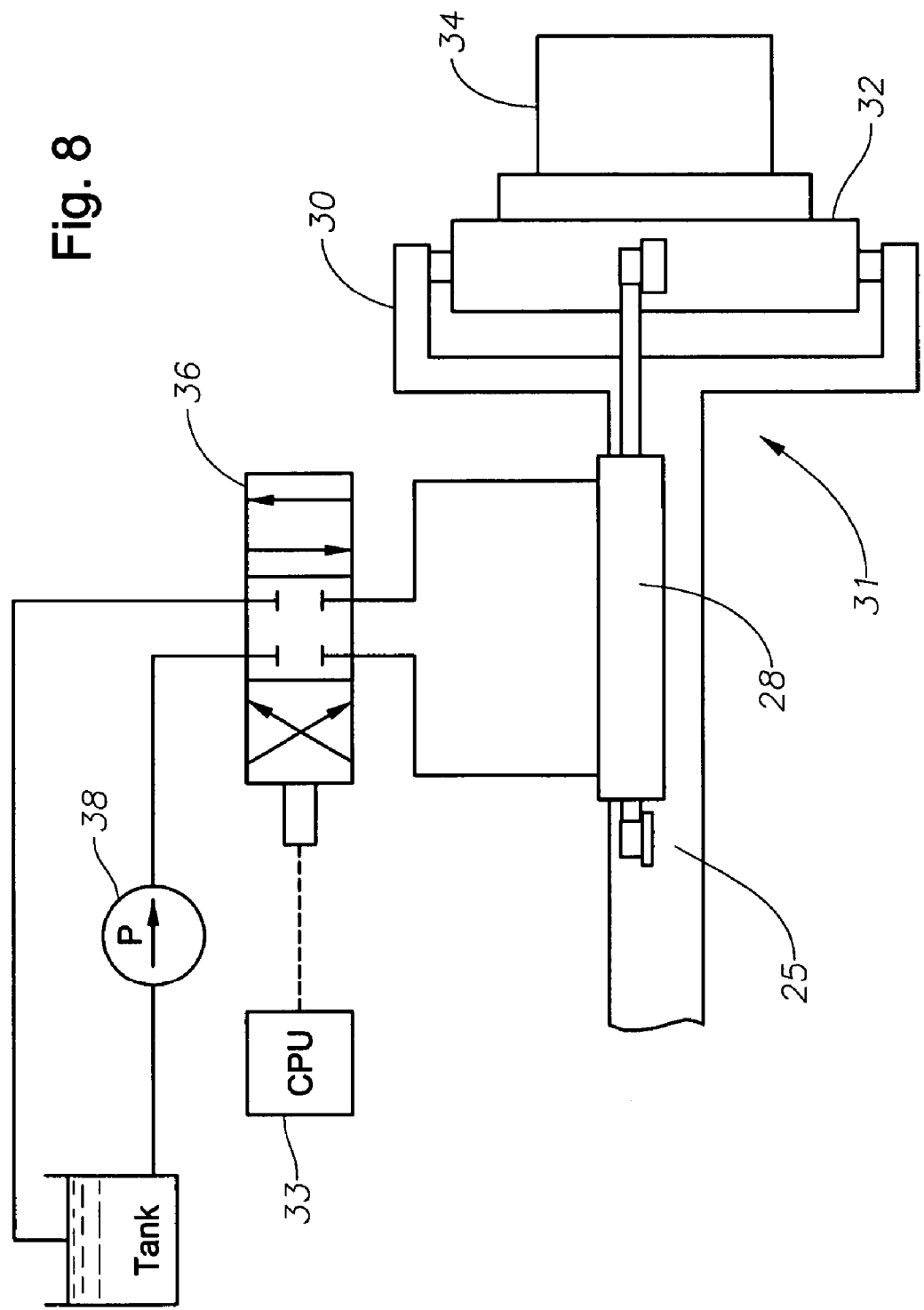
FIG. 8 is a schematic view of one of the steering servo mechanisms of the tool carrier of FIG. 1 with the wheel removed.

Referring to FIG. 8, in this example, hydraulic cylinder 28 is shown with its cylinder end pivotally mounted to forward axle 25. A clevis member 30 is rigidly mounted to the end of axle 25. A hub 32 is mounted to clevis member 30 for pivotal movement about an upright axis. The rod end of hydraulic cylinder 28 is pivotally connected to hub 32. A conventional planetary drive member 34 is mounted to hub 32. Planetary drive member 34 has a hydraulic motor for rotating one of the wheels 29 (FIG. 1), which bolts to it. A hydraulic proportional valve 36 for each wheel 29 (FIG. 1) selectively directs hydraulic fluid pressure to stroke or retract hydraulic cylinder 28. Additionally, hydraulic fluid pressure is delivered to the hydraulic motors of drive members 34 of the four wheels.

Tool carrier 11 has a hydraulic pump 38 that supplies hydraulic fluid pressure to the valves 36. Hydraulic pump 38 has an intake connected to a tank containing hydraulic fluid. Preferably a central processing unit, such as a microprocessor 33, electrically interconnects with the valves 36 of each steering mechanism 31 for providing signals to steering mechanisms 31 to steer wheels 29.

Referring again to FIG. 1, microprocessor 33 may be located in a cab 35 for the operator. Tool carrier 11 has a conventional engine 37, which is located on the rear of cab 35 in this embodiment, but it could be otherwise.

Figure 2:
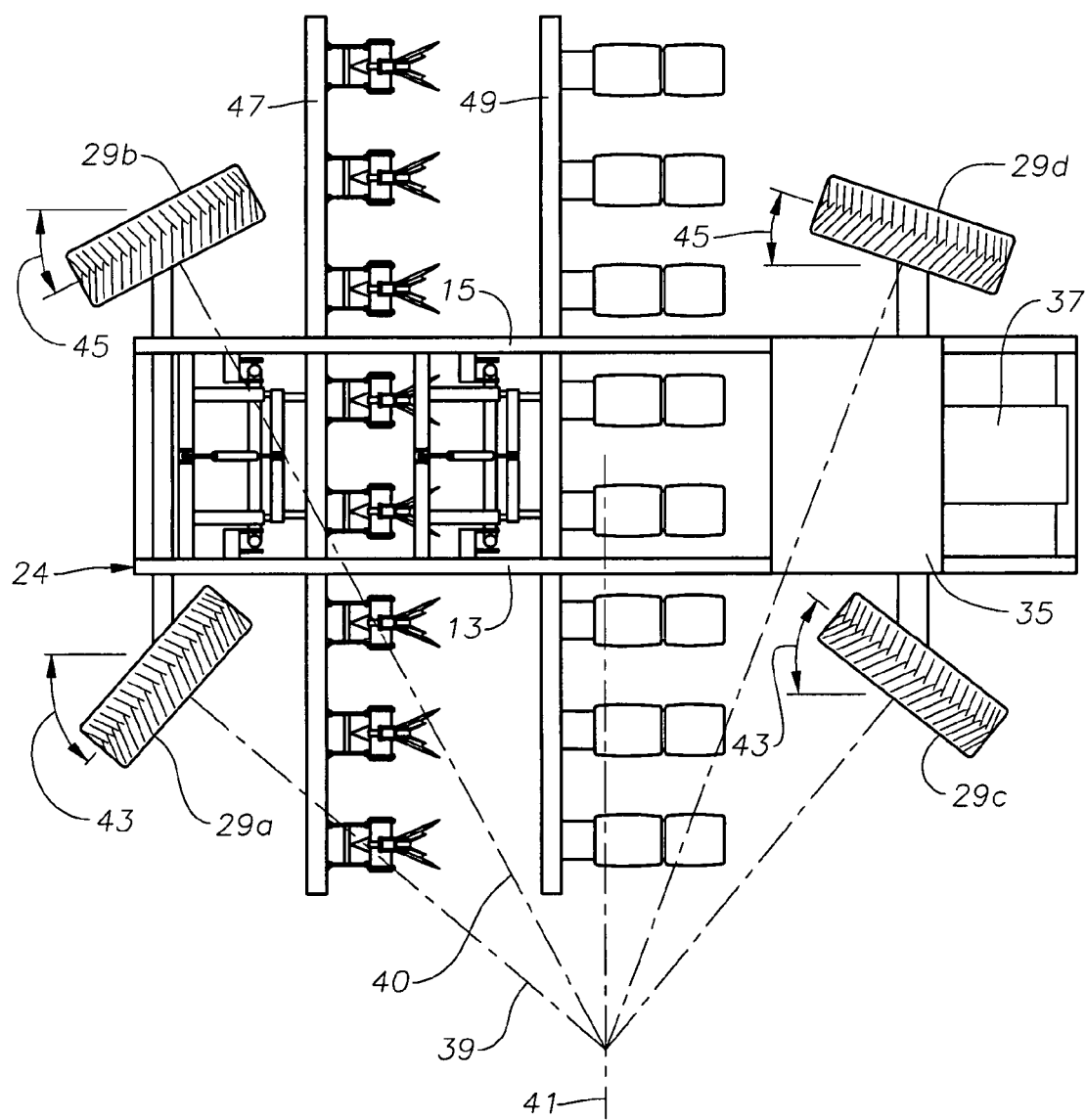
FIG. 2 is a top view of the tool carrier of FIG. 1, shown turning a corner.

Tool carrier 11 has a manual steering wheel or joystick (not shown) in cab 35, which when moved in manual mode sends electrical signals to microprocessor 33, which in turn provides signals to steering mechanisms 31 to steer wheels 29. Preferably, tool carrier 11 has a manual steering mode and an automatic steering mode. In the automatic steering mode, a guidance system, such as a global positioning system, controls steering through microprocessor 33. In the manual steering mode, preferably, the operator can select front wheel only steering or all wheel steering. The operator can further select all wheel steering in a crab fashion, wherein all four wheels 29 turn to the right in unison or to the left in unison. Also, the operator can select in manual mode a turn-around maneuver, in which the forward wheels 29a, 29b turn in one direction and the rearward wheels 29c, 29d in the opposite direction, as shown in FIG. 2. The turn-around maneuver typically is employed at the end of a row of crops. To avoid requiring excessive turning space at ends of rows, forward wheels 29a and 29b are shown being turned to the left while rearward wheels 29c and 29d are turned to the right. In the automatic mode, preferably the steering is either in front wheel only mode or all wheel mode in a crab fashion.

In the preferred embodiment, tool carrier 11 has a wide track, which for example is 12 feet between centers of left wheel 29a and right wheel 29b. The wheel base, or distance from the centerline of front wheels 29a, 29b to rear wheels 29c, 29d is 20.5 feet in this example. Wheels 29 turn proportionately in order to avoid skidding or sliding of wheels 29 during any turn, other than crab turns. As illustrated with the turn-around maneuver of FIG. 2, preferably the inside wheels 29a and 29c turn at a greater angle relative to outside wheels 29b and 29d. A radial line 39 extending from and concentric with the axis of each inside wheel 29a, 29c intersects a common center point 41. Similarly, a radial line 40 emanating from and concentric with the axis of each outside wheel 29b, 29d intersects the same center point 41. Radial lines 40 are longer than radial lines 39 because of the greater distance to outside wheels 29b, 29d. Each wheel 29 rotates about a substantially true circular path around the common center point 41.

In order to utilize the same center point 41, inside wheels 29a, 29c must turn at a greater angle 43 than angle 45 of outside wheels 29b, 29d, relative to a longitudinal axis of frame 24. Angles 43 for the forward and rearward inside wheels 29a, 29c are the same magnitude, except in opposite directions relative to the longitudinal axis of frame 24. Similarly angles 45 for the forward and rearward outside wheels 29b, 29d are equal but in opposite directions. The difference between angles 43 and 45 depends upon the track and the wheel base of wheels 29. In this embodiment, angle 43 for the inside wheels 29a, 29c is 27½ degrees and angle 45 for the outside wheels 29b, 29d is 55 degrees. If only the forward two wheels 29a, 29b are being steered, their steering angles would differ, but each would still steering about the same center point. The center point for front wheel only steering aligns with a radial line emanating from rearward wheels 29c, 29d.

If the turn of tool carrier 11 is made to the right, the reverse would be the case, with wheels 29b and 29d being the inside wheels and angle 43 being greater than angle 45. When in a four wheel manual steering mode and receiving a signal that the operator is beginning to turn right or left, microprocessor 33 automatically provides the greater steering angle to whichever wheels 29 are going to be on the outside of the turn.

Referring again to FIG. 1, a forward tool bar 47 and a rearward tool bar 49 are carried by tool carrier 11 under frame 24. Tool bars 47, 49 comprise elongated tubular members that extend laterally outward from and perpendicular to longitudinal beams 13, 15. Forward and rearward tool bars 47, 49 are generally conventional agricultural implements of a type towed behind a conventional tool carrier. Both forward and rearward tool bars 47, 49 are located between the forward set of wheels 29a, 29b and the rearward set of wheels 29c, 29d.

Figure 3:
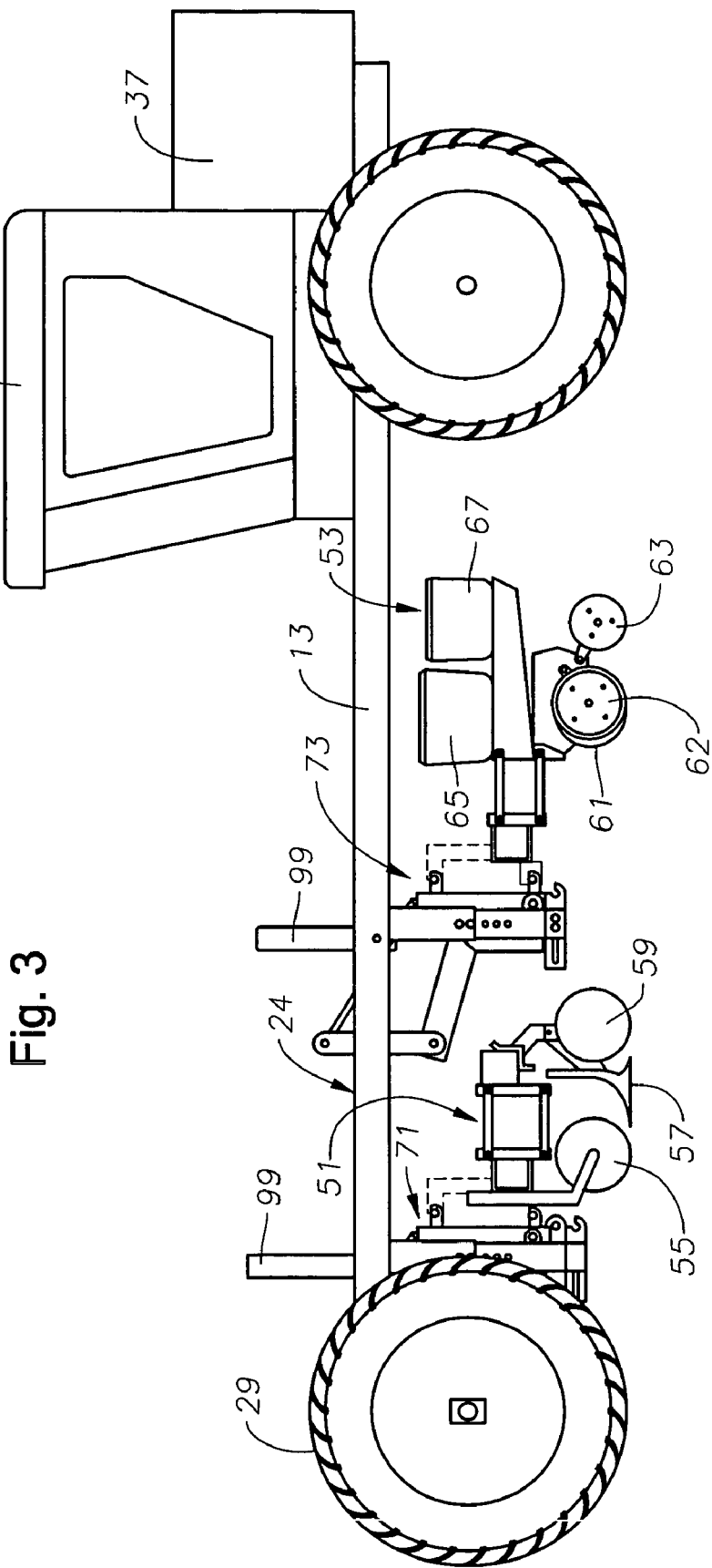
FIG. 3 is a side elevational view of the tool carrier of FIG. 1.

Forward and rearward tool bars 47, 49 support conventional equipment for row crop farming including preparing the rows, planting the seeds, dispensing insecticide, fertilizing and cultivating. Tools for other uses may also be mounted to tool bars 47, 49. In the example shown, forward tool bar 47 supports eight row preparation assemblies 51, each being identical and spaced along tool bar 47. Two of the row preparation assemblies 51 are located between longitudinal beams 13, 15 and the remaining six are located outside. The number of assemblies 51 could differ. Row preparation assemblies 51 may vary, and in the embodiment shown in FIG. 3, each includes a forward disc 55, a shovel 57 and a rearward disc 59. Forward discs 55 cut a straight line down the center of an existing ridge, and shovel 57 cuts off a portion of the top of the ridge. Rearward discs 59 remove soil from the sides of existing ridges.

Similarly, eight seed planting assemblies 53 are shown mounted to rearward tool bar 49 in FIG. 1. Each seed planting assembly 53 follows one of the row preparation assemblies 51. Seed planting assemblies 53 may vary, and in FIG. 3, each includes a furrow disc 61, a depth gauge wheel 62, a furrow closure wheel 63, a seed bin 65 and optionally an insecticide container 67 for granular insecticide. Furrow disc 61 forms a furrow in the top of the ridge formed by row preparation assembly 51. Closure wheel 63 closes the furrow after the seeds have been planted by the disc 61.

Tool bars 47, 49, or ones similar to them, can support other types of equipment, particularly cultivating equipment (not shown) for removing weeds from between the rows after planting. Conventional cultivators may be mounted to both forward and rearward tool bars 47, 49. For example, the cultivators on forward tool bar 47 may cut close to the crop and throw the weeds into the middle of the space between the rows. The cultivators on tool bar 49 will place soil over weeds in the row not removed by the cultivator on tool bar 47. These two operations would occur in a single pass.

Figure 4:
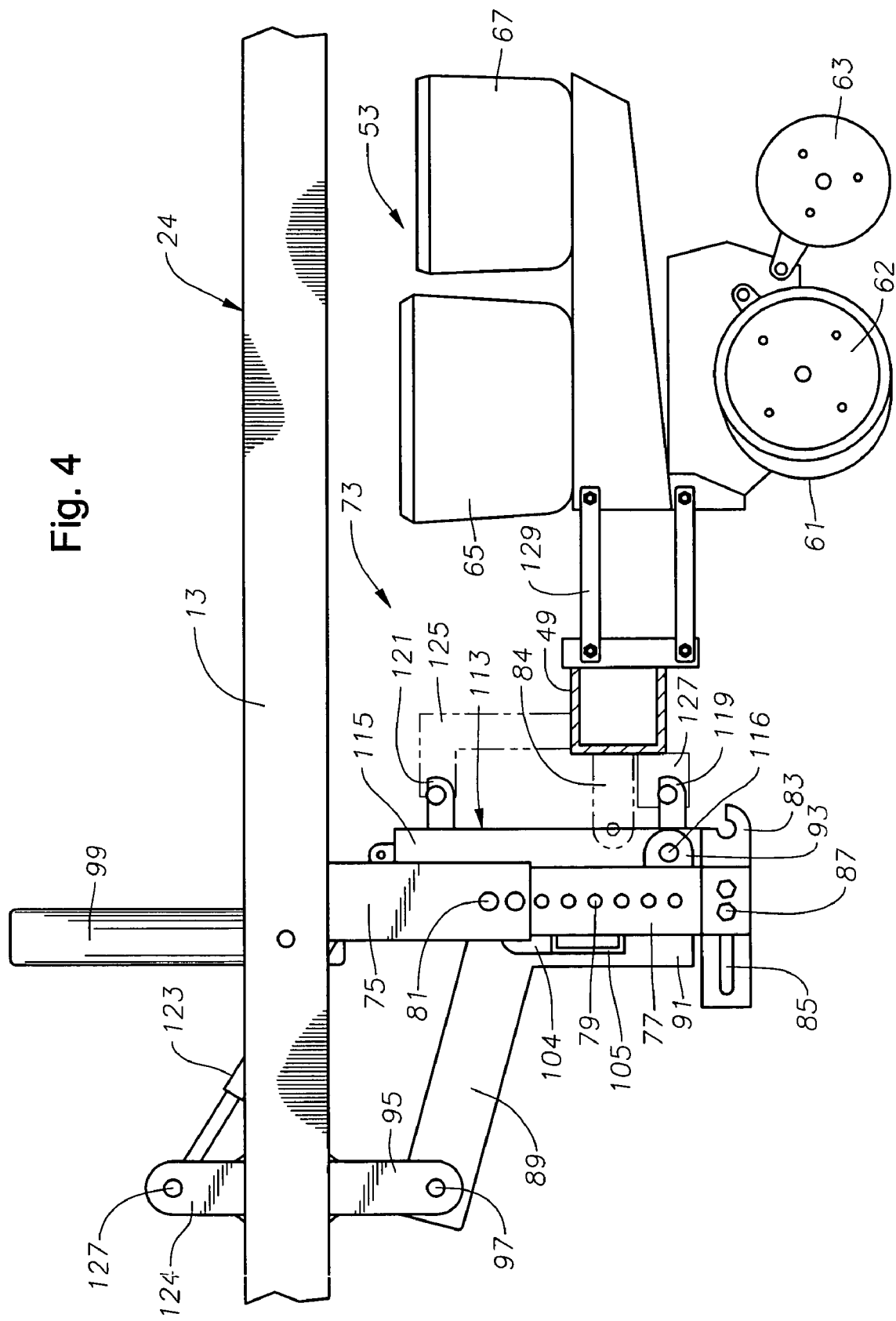
FIG. 4 is an enlarged sectional view of a portion of the tool carrier of FIG. 1, taken along the line 4-4 of FIG. 1.

As shown in FIG. 1, a tool bar carriage 71 releasably connects forward tool bar 47 to frame 24. An identical tool bar carriage 73 connects rearward tool bar 49 to frame 24. Tool bar carriages 71, 73 will selectively raise tool bars 47, 49 to lift assemblies 51, 53 above the ground for transport and turn-around movements at the ends of the rows. Referring to FIG. 4, a stabilizing leg 75 is rigidly mounted to each of longitudinal beams 13, 15, such as by welding. Each stabilizing leg 75 is a section of rectangular tubing that extends vertically downward from one of the longitudinal beams, which is shown to be longitudinal beam 13 in FIG. 4. A leg extension 77 telescopes within stabilizing leg 75 to allow a variable length for stabilizing leg 75. Extension 77 has a plurality of holes 79 extending along its length. Once a desired length is selected, a pin or bolt 81 inserts through a mating hole in leg 75 and one of the holes 77 to lock stabilizing leg 75 at the desired length. The width between adjacent stabilizing legs 75 is the same distance as between longitudinal beams 13, 15.

Figure 6:
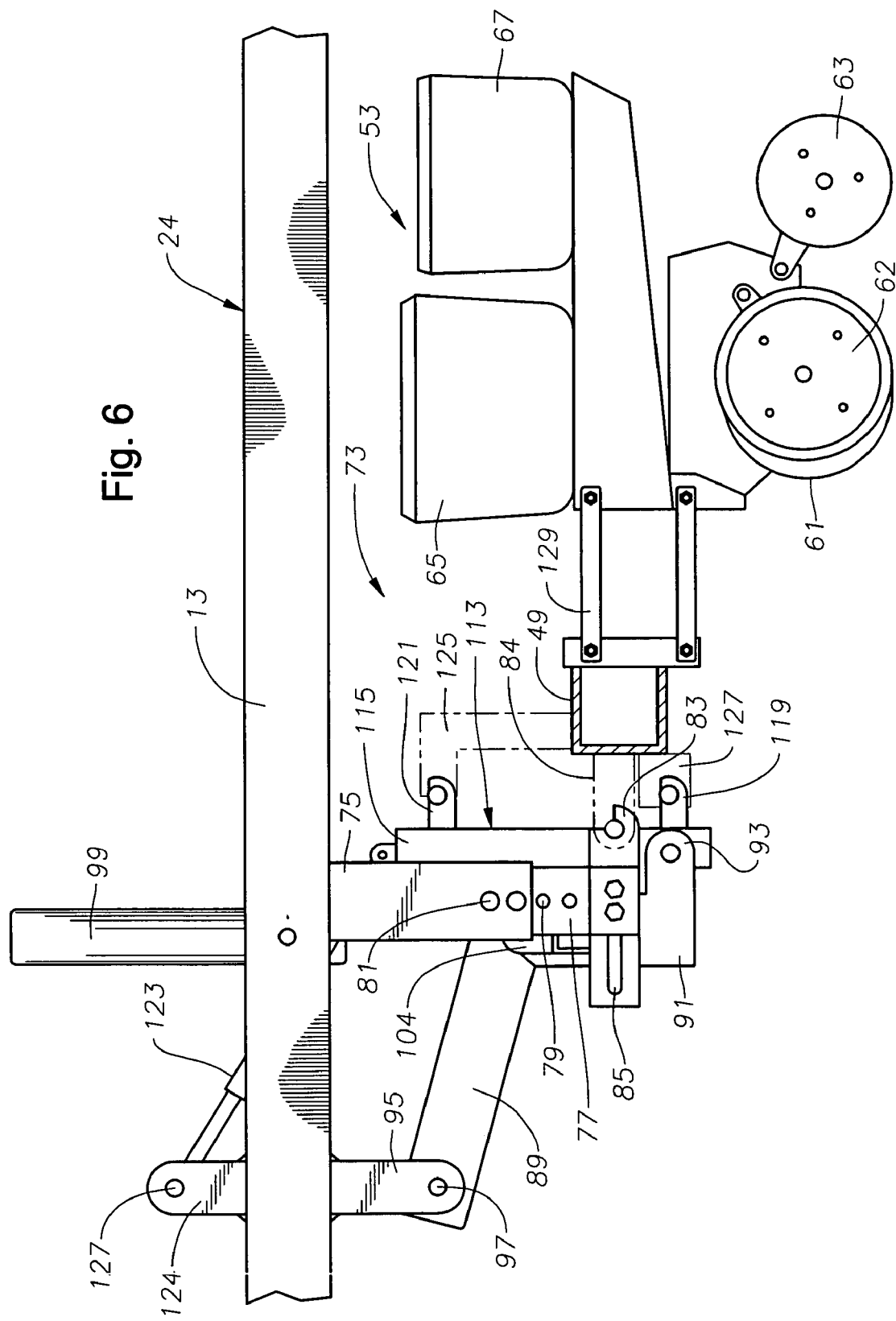
FIG. 6 is an enlarged sectional view of a portion of the tool carrier of FIG. 1, taken along the line 4-4 of FIG. 1, but showing the hook of the stabilizing leg engaged with a brace of the tool bar.

A hook or support 83 is mounted to the lower end of stabilizing leg extension 77. Hook 83 is located on the rearward side of stabilizing leg 75 in this embodiment. A brace 84, which is shown schematically, is rigidly connected to tool bar 49. Brace 84 extends forward from tool bar 49 and engages hook 83, as shown in FIG. 6. In FIG. 4, stabilizing leg extension 77 and hook 83 are shown in a lower position spaced below brace 84. Brace 84 may be a variety of shapes, and might comprise two flat arms with a cylindrical pin extending transversely between the arms for sliding into hook 83. The engagement of braces 84 with hooks 83 restrains lateral movement of tool bar 49 relative to frame 24.

To accommodate different dimensions of tool bars 49 and braces 84, preferably hook 83 can be adjusted in forward and rearward directions relative to stabilizing leg extension 77. Hook 83 has a horizontal elongated slot 85. Once a desired position has been reached, a bolt 87 is tightened. Bolt 87 passes through a portion of stabilizing leg extension 77 and slot 85 to fix the position of hook 83.

Figure 7:
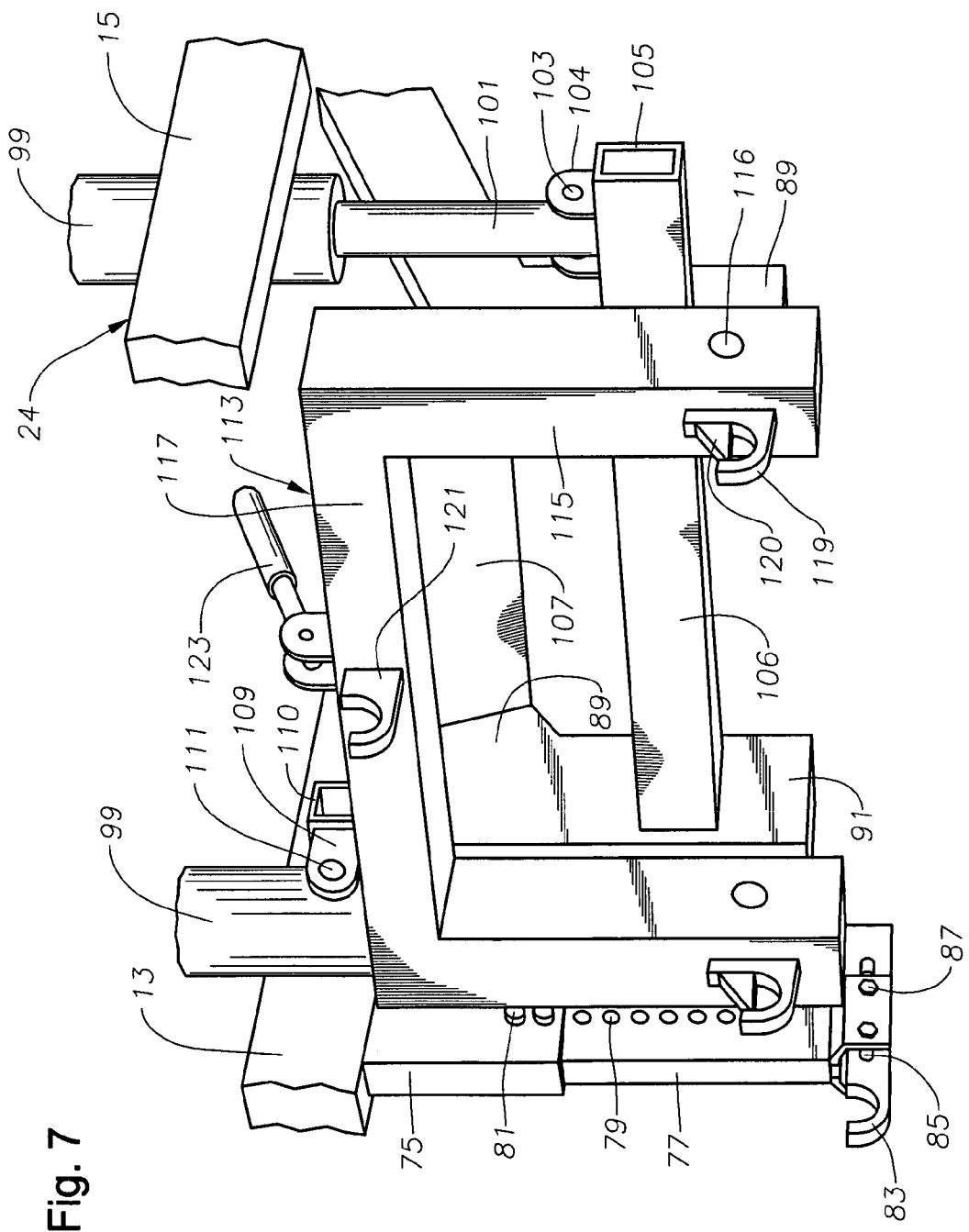
FIG. 7 is an enlarged perspective view of part of the tool carrier of FIG. 1, showing a rearward view of part of the tool bar carriage.

Tool bar carriage 73 also has a lifting arm assembly comprising a pair of spaced-apart arms 89, shown also in FIG. 7. Each arm 89 has a lower extension 91 that is rigidly formed with it and extends downward. In this embodiment, the angle between arm 89 and extension 91 is an obtuse angle but it could be other configurations. A lug 93 (FIG. 6) extends rearward from the lower end of each arm extension 91. Lifting arms 89 are spaced apart from each other but located within the confines of stabilizing legs 75. Each lifting arm 89 is mounted by a pivot pin 97 to a bracket 95. Brackets 95 are fixed to lateral beams 21, 23 such as by welding. Lifting arms 89 are able to rotate about pins 97.

Figure 5:
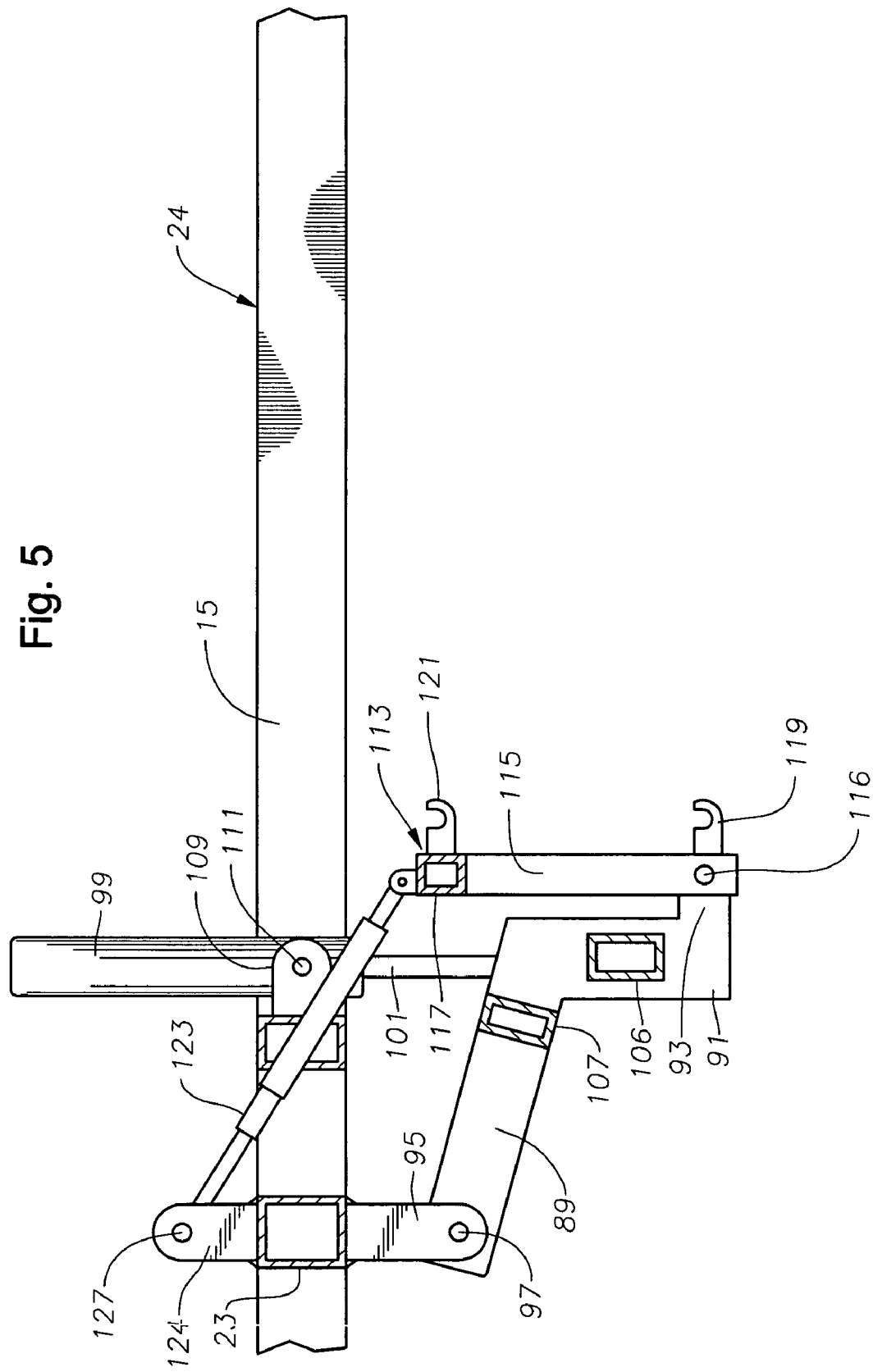
FIG. 5 is an enlarged sectional view of a portion of the tool carrier of FIG. 1, taken along the line 5-5 of FIG. 1, and with the seed planting equipment removed for clarity.

Referring to FIGS. 5-7, a pair of hydraulic cylinders 99, when supplied with hydraulic pressure, will rotate lifting arms 89 about pivot pins 97. Each hydraulic cylinder 99 has a piston rod 101 that extends downward and, as shown in FIG. 7, is pivotally connected to one of the lifting arms 89 by a pivot pin 103. Each pivot pin 103 is mounted to a clevis 104 located on the top of a support 105, which in turn is welded to an outer side of one of the lifting arms 89. A lower cross beam 106 and an upper cross beam 107 extend between lifting arms 89 to increase stiffness. Referring to FIG. 7, each hydraulic cylinder 99 is secured to a brace 110 by a clevis 109 and pivot pin 111. Each brace 110 is welded to one of the longitudinal beams 13, 15. When supplied with hydraulic fluid pressure, piston rods 101 will retract from the lower position shown in FIG. 5, causing lifting arm 89 to rotate counterclockwise about pivot pin 97. This movement does not affect stabilizing leg hooks 83 (FIG. 4), which remain stationary.

Referring to FIGS. 5 and 7, a tool bar adapter 113, shown schematically, is pivotally carried by lifting arm 89. Tool bar adapter 113 is preferably a conventional three-point hitch assembly of a type normally mounted to the rear of a conventional tool carrier for connection to a conventional tool bar. Tool adapter 113 has a base that includes a pair of spaced-apart vertical members 115. The lower end of each vertical member 115 is secured to one of the arm lugs 93 by a pivot pin 116. A horizontal member 117 (FIG. 7) extends between vertical members 115 at the upper ends. A pair of lower hooks 119 is mounted to adapter 113, each located on the rearward side of the lower end of one of the vertical members 115. Lower hooks 119 may have spring biased locks 120 (FIG. 7). An upper hook 121 is mounted to horizontal member 117 centered between vertical members 115.

A link bar 123 extends between horizontal member 117 and a bracket 124 mounted to frame 24, such as on cross member 23 (FIG. 1). Link bar 123 is a rigid member, but in the preferred embodiment, its length may be adjusted, similar to a turnbuckle. Link bar 123 is adjusted to position tool bar 49 and the associated assemblies 53 in the desired orientation when connected to hooks 119, 121. Adjusting the length of link bar 123 changes the angle between adapter vertical members 115 and arm extensions 91. When arms 89 rotate due to stroking of hydraulic cylinders 99, link bar 123 constrains adapter 113 to remain in a generally vertical orientation even though lift arm lugs 93 move along an arcuate path as lift arms 89 rotate. Vertical member 115 and lift arm extension 91 are shown parallel in the lower position of FIG. 5, but in the upper position (not shown), they will be at an acute angle relative to each other.

A conventional upper hook attachment 125 (shown schematically in FIGS. 4 and 6) is connected to tool bar 49 for mating with adapter 113. Upper hook attachment 125 engages upper hook 121. Similarly, a pair of lower hook attachments 127 is mounted to tool bar 49 for engaging lower hooks 119 of adapter 113. Upper and lower hook attachments 125, 127 are rigidly connected to tool bar 49.

Typically, a linkage 129 comprising four parallel bars connects each planting assembly 53 with tool bar 49. The releasable connection of forward tool bar 47 (FIG. 1) to frame 24 by carriage 71 is the same as described in connection with rearward tool bar 49, thus will not be discussed.

In operation, tool bars 47, 49 are preferably made up with the desired implements, which in this case comprises row preparation assembly 51 and seed planting assembly 53, then connected to tool carrier 11. The hookup may be done in a variety of ways. For example, the operator could actuate hydraulic cylinders 99 to lower lifting arms 89 to a lower position (not shown). The operator places tool bars 47, 49, along with assemblies 51, 53, on skids, then pulls them laterally under frame 24. Alternately, the operator could place tool carrier 11 on a skid and pull it laterally over tool bars 47, 49. The operator strokes hydraulic cylinders 99 (FIGS. 5-7) to move hooks 119 and 121 upward into engagement with attachments 125 and 127.

The operator continues to stroke hydraulic cylinders 99 upward, lifting tool bars 47, 49 until assemblies 51, 53 clear the ground. The operator proceeds to the field with tow bars 47, 49 in this upper position. Normally, the operator will manually steer during transport. With manual steering, signals from the steering wheel are relayed to microprocessor 33, which controls each steering mechanism 31 (FIG. 1) appropriately. For example, in one mode, for short corrections in steering while moving down a straight road, microprocessor 33 may only turn front wheels 29a, 29b. Once at the field and in alignment to begin planting, the operator adjusts stabilizing leg extensions 77 to the desired length. The operator lowers cylinders 99 until assemblies 51, 53 are in proper engagement with the soil. Braces 84 will re-enter engagement with hooks 83 when this occurs, as shown in FIG. 6. Preferably, during field operations, the operator maintains a downward force on braces 84 by pressure in hydraulic cylinders 99.

As the operator moves along the row, planting assemblies 51 will prepare ridges and assemblies 53 will plant seeds. The rigid connection of braces 84 with stabilizing legs 75 (FIG. 4) prevents lateral movement of bars 47, 49 relative to longitudinal beams 13, 15. This lateral rigidity enables precise planting to occur to assure that the seeds are planted in the centers of the ridges. Preferably, an automatic guidance system is employed that provides signals to microprocessor 33 (FIG. 1), which in turn automatically controls steering mechanisms 31 while planting and cultivating. At the end of the row, the operator may turn off the automatic steering and manually steer tool carrier 11 during the turn. Typically, the steering would be four wheel steering to enable a tight radius to occur at the turn, as shown in FIG. 2. Microprocessor 33 causes outside wheels 29b and 29d to turn at a lesser angle 45 than angle 43 of inside wheels 29a and 29b to maintain common center point 41.

The invention has significant advantages. Positioning the tool bar between the wheels rather than behind the axle provides greater control for the operator and increases lateral stability. The stabilizing legs and supports, being stationary with the frame, greatly restrain lateral movement of the tool bar. The independent steering servos allow precise steering control and automatic steering with a remote positioning system. The independent steering allows a fairly wide width for the frame.

While the invention has been shown in only one of its forms, it should be apparent to those skilled in the art that it is not so limited but is susceptible to various changes without departing from the scope of the invention. The braces that engage the hooks could be attached to the tool carriage rather than to the tool bar.

The invention claimed is:

1. An agricultural apparatus, comprising:
a frame having a longitudinal axis;
a lifting carriage mounted to the frame;
a tool bar adapter mounted to the lifting carriage;
a laterally extending tool bar for supporting agricultural equipment, the tool bar extending laterally outward from the frame and having a hitch assembly that releasably couples to the tool bar adapter;
the tool bar, hitch assembly, tool bar adapter, and lifting carriage defining a sub assembly that is movable relative to the frame between a lower position and an upper position;
a pair of laterally spaced-apart stabilizing legs rigidly mounted to the frame and extending downward from the frame along opposite sides of the lifting carriage; and
wherein the sub assembly engages the stabilizing legs while in the lower position to rigidly connect the tool bar to the frame and disengages from the stabilizing legs while in the upper position.

2. The apparatus according to claim 1, further comprising:
a support member on a lower portion of and forming a part of each of the stabilizing legs;
a pair of braces rigidly connected to the tool bar for connecting to the support members while the carriage is in the lower position and releasing from the support members while the carriage is in the upper position.

3. The apparatus according to claim 1, wherein a lower portion of each of the stabilizing legs telescopes relative to an upper portion to adjust a length of each of the stabilizing legs.

4. The apparatus according to claim 1, wherein:
each of the stabilizing legs has a lower portion containing a hook; and
the subassembly has a pair of engaging members, each of the engaging members engaging one of the hooks while the sub assembly is in the lower position.

5. The apparatus according to claim 1, wherein the lifting carriage comprises:
a pair of lifting arms, each of the lifting arms having an upper portion pivotally mounted at a pivot point to the frame and a lower portion to which the tool bar adapter is mounted; and
at least one hydraulic cylinder mounted to the frame for pivoting the lifting arms about the pivot point.

6. The apparatus according to claim 5 wherein the tool bar adapter comprises:
an adapter base having a lower portion pivotally mounted to a lower portion of the lifting arms;
a three-point hitch assembly mounted to the adapter base; and
a linkage bar extending between the frame and an upper portion of the adapter base to maintain the three-point hitch assembly substantially in a single plane as the lifting arms are moved by the hydraulic cylinder.

7. The apparatus according to claim 1, further comprising:
a steering servo mounted to each of the wheels for steering each of the wheels independently of the other wheels; and
a central control unit that controls the steering servos.

8. The apparatus according to claim 7, wherein the central control unit has a turn-around mode in which the central control unit positions an axis of each of the wheels on a radial line emanating from a common center point.

9. An agricultural apparatus, comprising:
a frame having a longitudinal axis;
a set of front wheels and a set of rear wheels mounted to the frame;
a lifting carriage mounted to the frame between the front and rear sets of wheels for movement between a lower position and an upper position relative to the frame;
a tool bar adapter mounted to the lifting carriage below the frame;
a pair of laterally spaced-apart stabilizing legs rigidly mounted to the frame and extending downward along opposite sides of the lifting carriage;
a support member on a lower portion of each of the stabilizing legs;
a laterally extending tool bar for supporting agricultural tools, the tool bar having a hitch assembly that releasably couples to the tool bar adapter for being raised and lowered by the tool carriage; and
a pair of braces rigidly connected to the tool bar for engaging the support members while the carriage is in the lower position to restrain lateral movement of the tool bar relative to the frame, the braces disengaging from the support members while in the upper position.

10. The apparatus according to claim 9, wherein each of the support members is adjustable to selected distances from the frame.

11. The apparatus according to claim 9, wherein the lower portion of each of the stabilizing legs telescopes relative to the upper portion to adjust the position of the support members relative to the frame.

12. The apparatus according to claim 9, wherein the lifting carriage comprises at least one hydraulic cylinder; and wherein
 the hydraulic cylinder maintains a downward force on the braces to maintain the braces in engagement with the support members while the lifting carriage is in the lower position.

13. The apparatus according to claim 9, wherein the lifting carriage comprises:
 a pair of lifting arms, each of the lifting arms having an upper portion pivotally mounted at a pivot point to the frame and a lower portion to which the tool bar adapter is mounted; and
 at least one hydraulic cylinder mounted to the frame for pivoting the lifting arms about the pivot point.

14. The apparatus according to claim 9 wherein the tool bar adapter comprises:
 an adapter base having a lower portion pivotally mounted to a lower portion of the lifting arms;
 a three-point hitch assembly mounted to the adapter base; and
 a linkage bar extending between the frame and an upper portion of the adapter base to maintain the three-point hitch assembly substantially in a single plane as the lifting arms are moved by the hydraulic cylinder.

15. The apparatus according to claim 9, further comprising:
 a hydraulic steering servo mounted to each of the wheels for steering each of the wheels independently of the other wheels; and
 a central control unit that controls the steering servos.

16. The apparatus according to claim 9, wherein the front and rear wheels are steerable to a left turn-around position, wherein:
 the front wheels steer left and the rear wheels steer right;
 a left one of the front wheels is at a greater angle relative to the longitudinal axis than a right one of the front wheels; and
 a left one of the rear wheels is at a greater angle relative to the longitudinal axis than a right one of the rear wheels.

* * * * *